United States Patent [19] [11] Patent Number: 4,640,630
Yoshioka et al. [45] Date of Patent: Feb. 3, 1987

[54] TURBOCHARGER BEARING ASSEMBLY

[75] Inventors: Masahiro Yoshioka, Ibaraki; Haruyoshi Tsubouchi, Katsuta, both of Japan

[73] Assignee: Hitachi, Ltd., Tokyo, Japan

[21] Appl. No.: 340,814

[22] Filed: Jan. 19, 1982

[30] Foreign Application Priority Data

Feb. 4, 1981 [JP] Japan .................................. 56-14353

[51] Int. Cl.4 ...................... F16C 17/00; F16C 19/55; F04B 17/00
[52] U.S. Cl. .................................. 384/129; 384/287; 384/901; 417/407
[58] Field of Search ............... 308/DIG. 4, DIG. 15; 384/287, 129, 118, 114, 111, 107, 100, 289, 295, 406, 901; 277/173, 174, 176, 177; 417/407

[56] References Cited

U.S. PATENT DOCUMENTS

| 3,056,634 | 10/1962 | Woollenweber et al. ... 308/DIG. 15 X |
| 3,058,787 | 10/1962 | Bernson ..................... 308/DIG. 4 X |
| 3,096,126 | 7/1963 | Woollenweber et al. ... 308/DIG. 15 X |
| 3,494,679 | 2/1970 | Burdette ................. 308/DIG. 15 X |
| 3,565,497 | 2/1971 | Miller .............................. 417/407 X |
| 4,371,219 | 2/1983 | Yamane ..................... 308/DIG. 4 X |

Primary Examiner—Stuart S. Levy
Assistant Examiner—Thomas R. Hannon
Attorney, Agent, or Firm—Antonelli, Terry & Wands

[57] ABSTRACT

In a supercharger bearing assembly including floating bushes journalling a rotor shaft interposed between the rotor shaft and a housing assembly, the floating bushes each have an inner peripheral portion of a smaller length than an outer peripheral portion, to reduce the amplitude of vibration of the floating bush, reduce the loss of power due to a frictional loss and increase resistance to seizure.

5 Claims, 5 Drawing Figures

TURBOCHARGER BEARING ASSEMBLY

BACKGROUND OF THE INVENTION

This invention relates to bearing assemblies for journalling rotor shafts of high-speed rotary machines, particularly superchargers for automotive vehicles, and, more particularly, to a bearing assembly of the floating bush type serving as a bearing for journalling the rotor shaft of a supercharger.

Generally a supercharger is provided with bearings for journalling a rotor shaft against a radial load and a thrust load applied thereto. Various types of bearing have been proposed for use as bearings for journalling the rotor shaft against a radial load. The main stay of the bearings used for this purpose nowadays is a bearing of the floating bush type, as shown in U.S. Pat. No. 3,565,497, for example. The bearing of the floating bush type includes a floating bush interposed between the rotor shaft and a housing and restrained against movement axially of the rotor shaft by snap pins or other movement preventing means attached to the housing. The floating bush has a construction in which its inner peripheral portion positioned against the outer peripheral surface of the rotor shaft is of the same length as its outer peripheral portion.

Meanwhile there has in recent years been an increased demand for increasing the speed of supercharger and obtaining a compact size therein. However, although an attempt has been made to increase the speed of the supercharger by using floating bushes described hereinabove, it has been impossible to attain the end because vibration increases in the high-speed rotation range and the floating bushes suffer a burning loss and a frictional loss. Moreover, owing to the structural arrangement whereby the inner and outer peripheral portions of a floating bush are as closely spaced apart as possible from adjacent parts for minimizing vibration, the inner peripheral portion has a peripheral velocity of over 100 m/s and as a result an increase in frictional loss and further more scoring is inevitable.

SUMMARY OF THE INVENTION

Accordingly an object of the invention is to provide a supercharger bearing assembly suitable for use with a supercharger rotating at high speed.

Another object is to provide a supercharger bearing assembly capable of reducing the amplitude of vibration thereof, reducing the loss of power due to a frictional loss and increasing resistance to seizure.

The aforesaid objects are accomplished according to the invention by providing, in a supercharger bearing assembly including floating bushes for journalling a rotor shaft of a supercharger, an improvement whereby an inner peripheral portion of each floating bush is smaller in length than an outer peripheral portion thereof.

Additional and other objects, features and advantages of the invention will become apparent from the description set forth hereinbelow when considered in conjunction with the accompanying drawings.

DETAILED DESCRIPTION OF THE PREFERRED EMBODIMENTS

Figure 1:
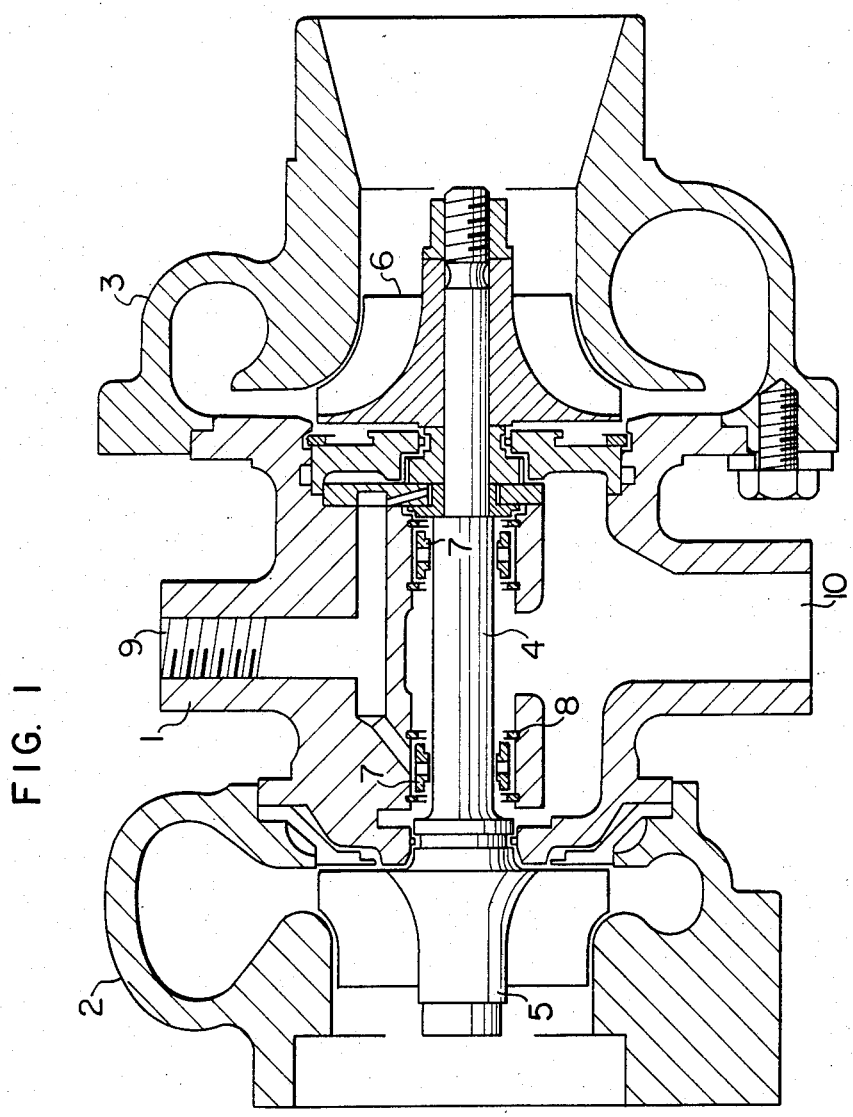
FIG. 1 is a vertical cross sectional view of a supercharger incorporating therein a first embodiment of the bearing assembly in conformity with the invention.

As shown in FIG. 1, a bearing assembly includes a housing assembly formed of an intermediate housing 1, a turbine housing 2 and a blower housing 3. A rotor shaft 4 has a turbine impeller 5 mounted at one end thereof and a blower impeller 6 mounted at the other end thereof and is journalled at its intermediate section by two floating bushes 7 interposed between the rotor shaft 4 and the intermediate housing 1. The floating bushes 7 are secured axially in place by retaining rings 8 attached to the intermediate housing 1. The floating bushes 7 receive a supply of lubricant through a lubricant inlet port 9 formed in the intermediate housing 1. After lubricating the floating bushes 7, the lubricant is discharged through a lubricant outlet port 10.

Figure 2:
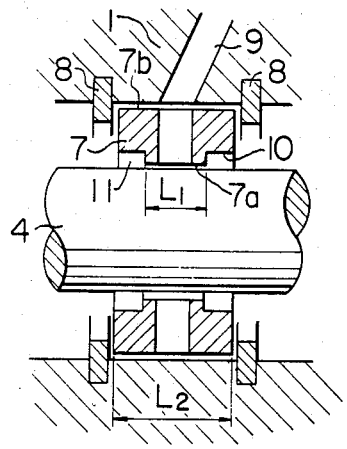
FIG. 2 is a vertical cross sectional view, on an enlarged scale, of the first embodiment shown in FIG. 1.

The floating bushes 7 are, as shown in FIG. 2, each constructed such that an inner peripheral surface of the floating bush 7 is cut out in stepped fashion on opposite sides of an inner peripheral portion 7a as indicated at 11. The provision of the cutouts 11 on opposite sides of the inner peripheral portion 7a of the floating bush 7 enables the length $L_1$ of the inner peripheral portion 7a to be smaller than the length $L_2$ of an outer peripheral portion 7b thereof.

By virtue of this feature in the construction of the floating bush 7, it is possible to reduce vibration and reduce the loss of power due to frictional loss and at the same time to avoid scoring. More specifically, as a result of reducing the length $L_1$ of the inner peripheral portion 7a of the floating bush 7 as compared with the length $L_2$ of the outer peripheral portion 7b thereof, the oil film formed on the inner peripheral surface of the floating bush 7 is prevented from becoming unstable, thereby enabling vibration to be reduced. A bearing friction loss caused by the floating bush 7 is proportional to the length $L_1$ of the inner peripheral portion 7a of the floating bush 7. Thus by reducing the length $L_1$ of the inner peripheral portion 7a, it is possible to lessen the loss of power caused by the bearing. Moreover, a reduction in bearing friction loss enables a rise in the temperature of the floating bush 7 to be avoided, thereby making it possible to avoid scoring of the floating bush 7.

Figure 3:
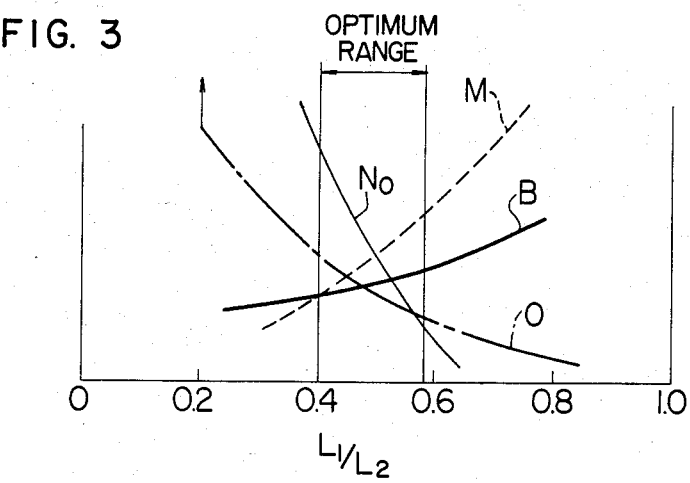
FIG. 3 is a graphical illustration of various characteristics of the bearing assembly according to the invention with respect to the ratio of the length of the inner peripheral portion of the floating bush to the length of the outer peripheral portion thereof.

In the bearing of the floating bush type shown in FIG. 2 and described hereinabove, theoretical, and experimental studies of the relation between the ratio $L_1/L_2$ or the ratio of the length $L_1$ of the inner peripheral portion 7a of the floating bush 7 to the length $L_2$ of the outer peripheral portion 7b thereof and the stable rotation speed $N_o$, bearing rigidity B, mechanical loss M and oil flow rate O at different rotation speed were carried out. The results obtained are shown in FIG. 3. As can be seen in the figure, a reduction in the value of the ratio $L_1/L_2$ causes a reduction in bearing rigidity B and mechanical loss M and an increase in stable rotation speed $N_o$ and oil flow rate O. Thus, it is preferred that the length $L_1$ of the inner peripheral portion 7a and the length $L_2$ of the outer peripheral portion 7b be related to each other to have values in the following range:

$$0.4 L_2 \leq L_1 \leq 0.58 L_2.$$

Figure 4:
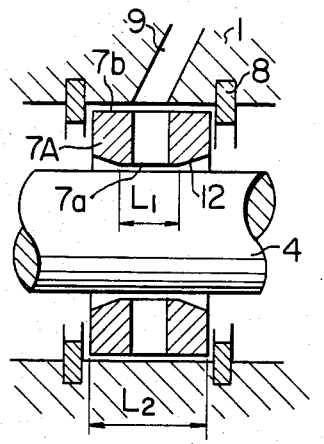
FIG. 4 is a vertical cross sectional view of the bearing assembly comprising a second embodiment of the invention.

FIG. 4 shows a second embodiment of the bearing assembly in conformity with the invention. In the second embodiment, the bearing bush 7A is tapered as indicated at 12 on opposite sides of the inner peripheral portion 7a, so as to thereby reduce the length $L_1$ of the inner peripheral portion 7a of the floating bush 7A as compared with the length $L_2$ of the outer peripheral portion 7b thereof.

In the aforesaid construction, it is possible to reduce vibration and reduce the loss of power due to frictional loss, as is the case with the embodiment shown in FIG. 2. The tapered portions 12 of the floating bush 7A have a centrifugal pumping function, so that the discharge of lubricant from the inner peripheral surface of the floating bush 7A can be promoted and a loss due to agitation can be avoided in this part. Thus, overheating of the floating bush 7A can be avoided.

Figure 5:
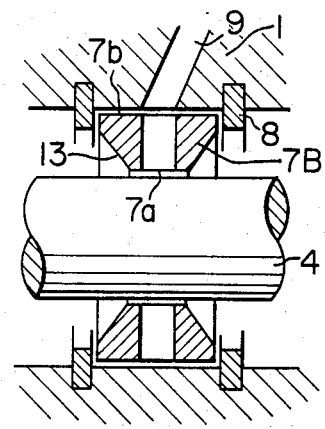
FIG. 5 is a vertical cross sectional view of a third embodiment of the invention.

FIG. 5 shows a third embodiment of the bearing assembly in conformity with the invention. In this embodiment, tapered portions 13 formed on opposite sides of the inner peripheral portion 7b of the floating bush 7B extend from the inner peripheral surface near to the vicinity of the outer peripheral portion 7b on the outer peripheral surface of the floating bush 7B, to further promote the centrifugal pumping function performed by the tapered portions in draining the lubricant as compared with the embodiment shown in FIG. 4.

In the embodiments shown and described hereinabove, the floating bushes 7, 7A, 7B have been shown and described as being secured in place by means of the retaining rings 8 to prevent their axial movement. However, it is to be understood that the invention is not limited to this specific form of floating bush securing means and that any other suitable securing means may be used in the invention for securing the floating bushes 7, 7A, 7B in place.

From the foregoing description, it will be appreciated that the bearing assembly provided with floating bushes according to the invention is capable of reducing vibration thereof, avoiding the loss of power due to a frictional loss and preventing scoring of the bearing, as compared with bearing assemblies provided with floating bushes of the prior art. Thus, the bearing assembly provided with floating bushes according to the invention has particular utility for use with high-speed rotary machines.

What is claimed is:

1. A supercharger bearing assembly comprising floating bushes for journalling a rotor shaft, the floating bushes being interposed between the rotor shaft and a housing assembly, characterized in that said floating bushes are each formed with an inner peripheral portion having an axial length less than an axial length of an outer peripheral portion thereof, and in that the axial length $L_1$ of the inner peripheral portion of each floating bush and the axial length $L_2$ of the outer peripheral portion thereof have values related to each other such that $0.4L_2 \leq L_1 \leq 0.58L_2$.

2. A supercharger bearing assembly as claimed in claim 1, wherein each floating bush includes cutouts disposed in stepped fashion on opposite sides of said inner peripheral portion thereby making the length of the inner peripheral portion less than the axial length of the outer peripheral portion.

3. A supercharger bearing assembly as claimed in claim 1, wherein each floating bush includes a tapered portion disposed on opposite sides of said inner peripheral portion thereby making axial the length of the inner peripheral portion less than the axial length of the outer peripheral portion.

4. A supercharger bearing assembly as claimed in claim 3, wherein said tapered portions extend from the inner peripheral portion to an intermediate portion of a large thickness of the floating bush at its side.

5. A supercharger bearing assembly as claimed in claim 3, wherein said tapered surfaces extend from the inner peripheral portion to the outer peripheral portion of the floating bush at its side.

* * * * *